United States Patent
Howlett

[11] Patent Number: 6,006,855
[45] Date of Patent: Dec. 28, 1999

[54] BOREHOLE SEISMIC DETECTOR SYSTEM EMPLOYING STABILIZERS

[75] Inventor: Donald L. Howlett, Kingwood, Tex.

[73] Assignee: Texaco Inc., White Plains, N.Y.

[21] Appl. No.: 09/095,370

[22] Filed: Jun. 10, 1998

Related U.S. Application Data

[60] Provisional application No. 60/050,596, Jun. 24, 1997.

[51] Int. Cl.[6] ................................................ G01V 1/40
[52] U.S. Cl. .................... 181/102; 181/103; 181/104; 181/106; 367/911
[58] Field of Search ................ 367/25, 911; 324/367; 181/105, 102, 106, 103, 104

[56] References Cited

U.S. PATENT DOCUMENTS

| | | | |
|---|---|---|---|
| 4,715,470 | 12/1987 | Paullsson | 181/106 |
| 4,819,760 | 4/1989 | Ptermann | 181/102 |
| 5,027,918 | 7/1991 | Cole | 181/105 |
| 5,060,751 | 10/1991 | Kuhlman | 181/102 |

*Primary Examiner*—Christine Oda
*Assistant Examiner*—Anthony Jolly
*Attorney, Agent, or Firm*—Henry H. Gibson; Howrey & Simon

[57] ABSTRACT

Systems are disclosed for securing near vertically deployed seismic detector systems in a cased well borehole from oscillatory motion during a seismic survey. In one embodiment a generally cylindrical body member of an unsymmetrical shape having one flat side is used opposite a selectably extensible backup locking arm. In a second embodiment a generally symmetrical cylindrical body member having sets of four essentially coplanar contacting feet disposed at 90 degree circumferential spacing an opposite ends is provided. The sets of locking feet on opposite ends of the tool body member are phased 45 degrees apart circumferentially with respect to each other. Locking edges and feet may be magnetically assisted if desired.

21 Claims, 5 Drawing Sheets

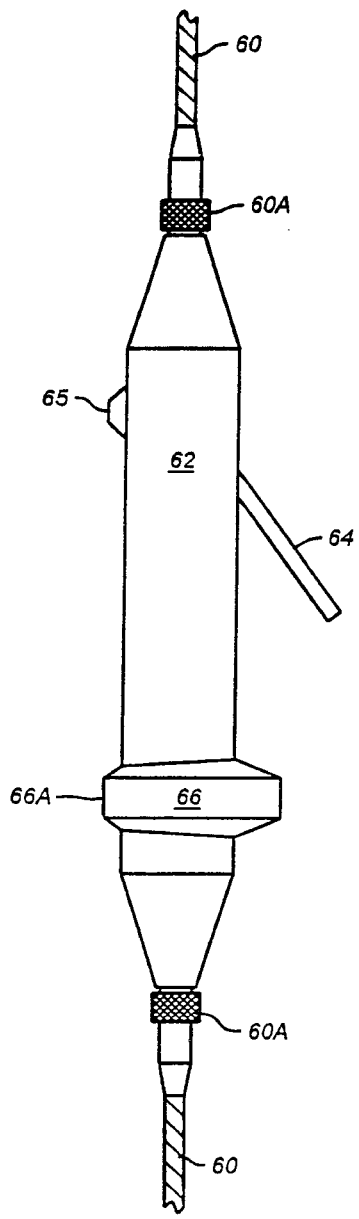
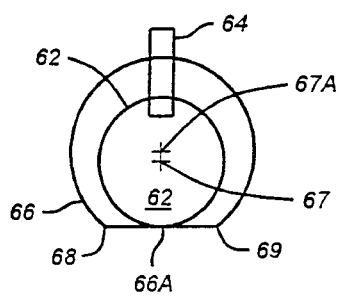
FIG. 6
FIG. 5
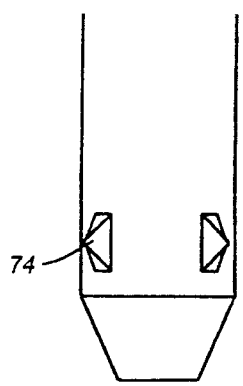

BOREHOLE SEISMIC DETECTOR SYSTEM EMPLOYING STABILIZERS

This application claims benefit of Provisional Application Serial No. 60/050,596 filed Jun. 24, 1997.

FIELD OF THE INVENTION

This invention relates to seismic exploration systems and, more particularly, to vertically deployed seismic detector systems which are placed in well boreholes, hundreds, or even thousands, of feet below the surface of the earth.

BACKGROUND OF THE INVENTION

Seismic exploration systems employing arrays of detectors deployed vertically in well boreholes have become important in recent years. Usually such systems have a plurality of detectors deployed along a well borehole at different vertical depths. Each detector may comprise, for example, a one component hydrophone or a three component geophone (i.e. a geophone detector capable of detecting the x, y, and z orthogonal spatial components of seismic waves arriving at its location). These systems include an electronic digitizer for digitizing the measured geophone components' amplitudes, and also, a transmission system for transmitting the digitized signal representation as time series of digital numbers uphole to a receiving system including a recorder and processor. The vertically deployed seismic detectors are usually connected together by well logging cable, which may be of the conventional armored seven conductor type, or by fiber optic cable, if desired.

In conducting borehole seismic surveys it is desirable to deploy a large number of seismic detectors in a well. Usually modules as described above, may be spaced at 10 foot intervals and may be joined together by jumper cables. In using three component borehole seismic detectors it is important that each detector be firmly attached to the borehole wall in order to properly capture the three spatial components of particle motion of arriving seismic waves or signals. In the prior art this has typically been accomplished by the use of a mechanical locking arm which can be extended from the side of a tool to urge, or force, the body member of the tool against the borehole wall opposite the locking arm. These locking arm systems have usually been operated from the earth's surface by controlling electrical motors and gear drives attached to them, or by controlling the flow of hydraulic fluid to a down hole hydraulic drive system connected to the arm. Such locking arm mechanisms contain many precision moving parts and high pressure seals and rapidly become the most complicated part of the downhole seismic system, as well as that associated with most tool malfunctions or breakdowns. In this regard, a catastrophic tool breakdown of the locking arm system can cause the tool to become stuck in well borehole, requiring an expensive "fishing" operation to retrieve it.

Accordingly, it would be most desirable to have a borehole seismic tool locking system which is less complicated, more reliable, and less likely of catastrophic failure requiring fishing.

Other than catastrophic sticking, other modes of locking arm failure can also occur. Detector tool body members are generally of elongated cylindrical shape. Typically there are two pairs of stabilizing feet on the side of the tool opposite the locking arm (backside of the tool). One pair of feet is generally near the top of the tool and other pair of feet are near the bottom of the cylindrical tool module. The purpose of these feet is to prevent the tool from rocking or moving sideways and introducing undesirable oscillations into the measurements. If the tool is properly centered in the casing of a cased well borehole, this works well, as the locking arm works along a true diagonal of the casing. However, errors can occur because most well boreholes are not perfectly vertical. The elongated cylindrical tool body tends to ride against the downhole side of the casing as the tool is moved through the borehole. This results in one of the upper, lower, or both pairs of feet being in engagement with the borehole wall prior to deployment of the locking arm. When the locking arm is then extended, these contacting or engaged feet tend to falsely anchor the tool body to the downhole side of the casing, and only along that side. This provides an unstable, false anchor which may later release, allowing the tool to oscillate.

In the past it has been attempted to deploy the locking arms of the seismic tool modules while keeping the module moving to avoid this problem. This works well if only one tool module is used, but becomes increasingly difficult as more tool modules are employed. It would therefore, be highly desirable to provide a seismic tool locking system which could securely lock a tool in place while the tool was motionless and still avoid the tool "false locking" or eccentering problem just described.

BRIEF DESCRIPTION OF THE INVENTION

The present invention provides new tool body and accessory shapes which are designed to overcome the above described difficulties which are encountered with the prior art. In one embodiment, an asymmetrical tool body shape comprising a cylinder with a flat side directly opposite the locking arm is provided. The suspension cable is attached to the end of the tool body module off center toward the flat side. This flat sided shape thus preferentially seeks a position with the two corners of the flat body side of the flat side in contact with the casing of the borehole wall. When the locking arm is deployed the two corners remain in contact with the casing wall. This tendency toward natural centering of the tool is further enhanced by installing either permanent or electromagnets at the corners of the flat side. Once the tool has "fallen" into place, these magnets resist any torque tending to rotate the tool out of the desired position. An alternative arrangement of this embodiment of the invention provides one or more tool collars having a flat side as described above, which are attached to the exterior of a conventional cylindrical tool body. One or more such flat sided collars, as desired, may be employed along the length of the tool with the flat sides or faces thereof aligned with each other and opposite the tool locking arm.

In a second embodiment of the invention, a round cylindrical tool body is provided on one end thereof with four sharp pointed "feet" arranged 90 apart from each other circumferentially around the tool body. Similar feet on the opposite end of the tool are provided and also spaced 90 apart from each other, but are displaced 45 from those feet at the opposite end. When such a tool is suspended in a less than vertical borehole it will prefer to lay against the downhole side casing wall with a three point foot contact, two feet contacting the downhole side of the wall on one end and one foot contacting the wall on the opposite end. There are 8 angular positions, at 45 intervals where the tool makes such a stable 3 point contact. In another arrangement of this embodiment, the feet may be magnetized by either permanent or electromagnets to provide additional stability and to reduce any horizontal oscillations. The 90° disposed feet on either end of the tool may be vertically displaced in pairs, if desired. A particular pattern for magnetic polarization to promote this effect is described.

BRIEF DESCRIPTION OF THE DRAWINGS

FIG. 5 is a schematic side view showing an arrangement of locking devices according to the invention.

FIG. 6 is a schematic top view of the tool of FIG. 5.

DETAILED DESCRIPTION OF THE INVENTION

Figure 1:
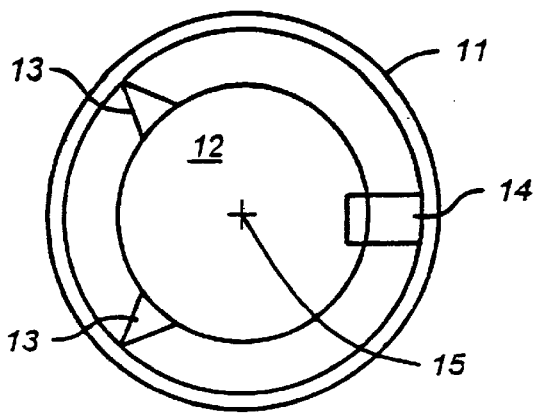
FIG. 1 is a schematic top view in section showing a seismic tool properly locked in a cased borehole.

Referring initially to FIG. 1, a top view in section showing a seismic tool of the type used in the prior art properly centered and locked in a cased well borehole. Steel casing 11 lines the borehole wall in which tool body member 12 is suspended from a wireline cable (not shown) connected to its upper end near its radial center of gravity 15. The tool body member 12 is equipped with at least one pair of sharp pointed feet 13 disposed co-planarly near its upper or lower end, or with two pair of such coplanar feet at both ends of the body member 12. When tool 12 has reached the desired depth at which its geophone system is to be deployed, a locking arm 14, hinged to tool body 12 at one end thereof is deployed. Locking arm 14 contacts casing 11 urging the pointed feet 13 into locking engagement with the casing 11. Note that if properly locked as in FIG. 1 that locking arm 14 deploys along a true diameter of casing 11.

Figure 2:
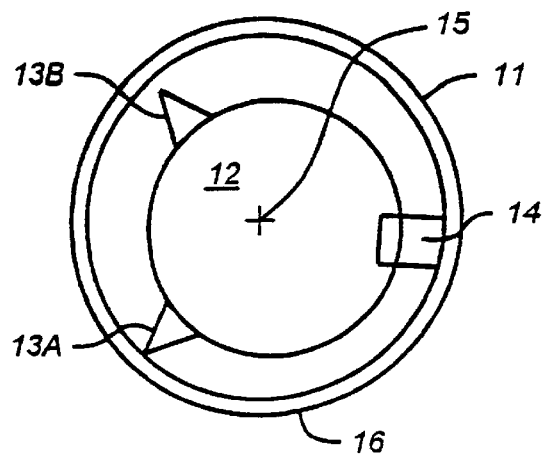
FIG. 2 is a schematic top view in section showing a seismic tool not properly locked in a cased borehole.
Figure 3:
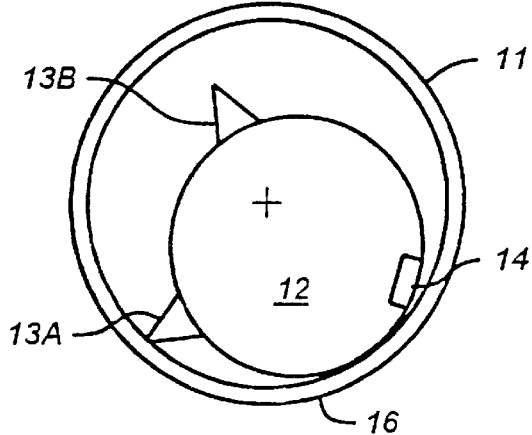
FIG. 3 is a schematic top view in section showing a typical tool position with the locking arm retracted.

Referring now to FIG. 2 and FIG. 3 the same prior art tool shown in FIG. 1 is shown improperly or falsely anchored in a cased borehole. In FIG. 3, because the borehole axis is not perfectly vertical, the tool body 12 falls or lies against the downhole side 16 of casing 11 as shown. Pointed foot 13A engages the casing as shown, but prior to locking arm 14 extension (FIG. 3), pointed foot 13B does not engage the casing 11. Thus, when locking arm 14 is deployed (as in FIG. 2), the frictional force between engaged pointed foot 13A and locking arm 14 contacting casing 11 is sufficient to cause the locking arm 14 deployment system to falsely sense that the tool is locked in place. This keeps the arm deployment system from deploying the locking arm 14 any further. This leaves the tool body member 12 in the unstable, falsely anchored position shown in FIG. 2.

Figure 4:
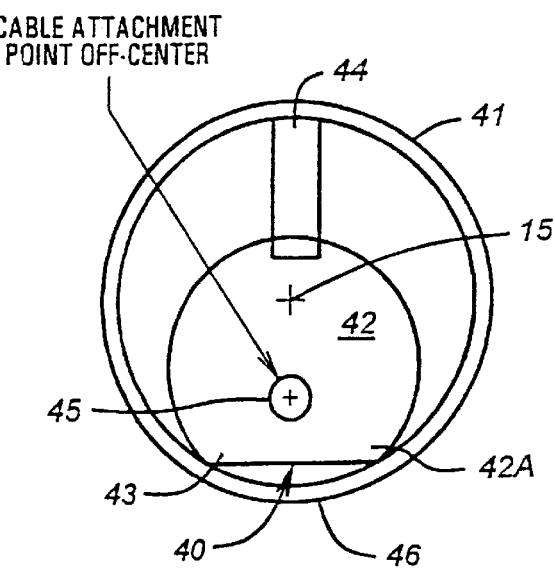
FIG. 4 is a schematic top view in section showing a tool according to concepts of the present invention locked in a cased borehole.

FIG. 4 shows, in a sectional view, a tool body configuration 42 in accordance with concepts of the present invention. Well casing 41 is not vertical, having a downhole side 46, as shown. The cylindrical tool body 42 is provided along its full length with a flat side 40, thus creating corners 42A and 43. The suspension cable (not shown) is connected to an eccentric radially displaced point 45 which tends to fall toward the low side 46 of casing 41. When it is desired to anchor tool body 42 in place, the backup arm or locking arm 44 is deployed. Deployment of arm 44 urges the flat side 40 of tool body 42 against the low side 46 of casing 41 as shown. This is a stable configuration which will remain in place throughout a seismic survey.

Referring now to FIGS. 5 and 6 an alternative arrangement to that of FIG. 4 but still according to concepts of the present invention is shown in a schematic side view (FIG. 5) and in a top view (FIG. 6). A tool body member 62 is cylindrical in shape and has a circular cross section as shown in FIG. 6. Tool body member 62 is provided near the upper end thereof with a single engagement foot 65 for engaging well casing (not shown). The cylindrical tool body 62 is connected at its radial center 67 with top and bottom ends to wireline suspension cable 60 via appropriate wireline connectors 60A as shown. Near its lower end tool body member 62 is provided with an affixed, flat sided, off centered collar member 66. Collar 66 has a flat side 66A which is disposed diagonally opposite locking arm 64 and longitudinally aligned with foot member 65. In this configuration collar flat surface 66A tends to ride the low side of the well casing as in FIG. 4. When locking arm 64 is deployed at the desired depth, corners 68 and 69 and foot 65 provide a stable three point locking arrangement for the tool.

Figure 7B:
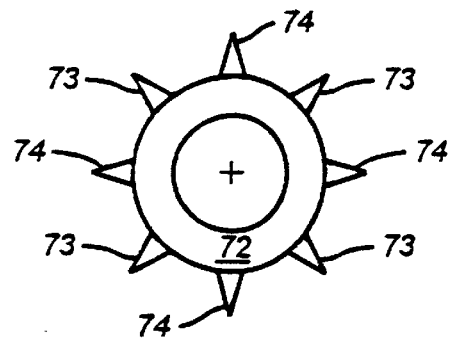
FIG. 7B is a schematic top view of the tool of FIG. 7A.
Figure 7A:
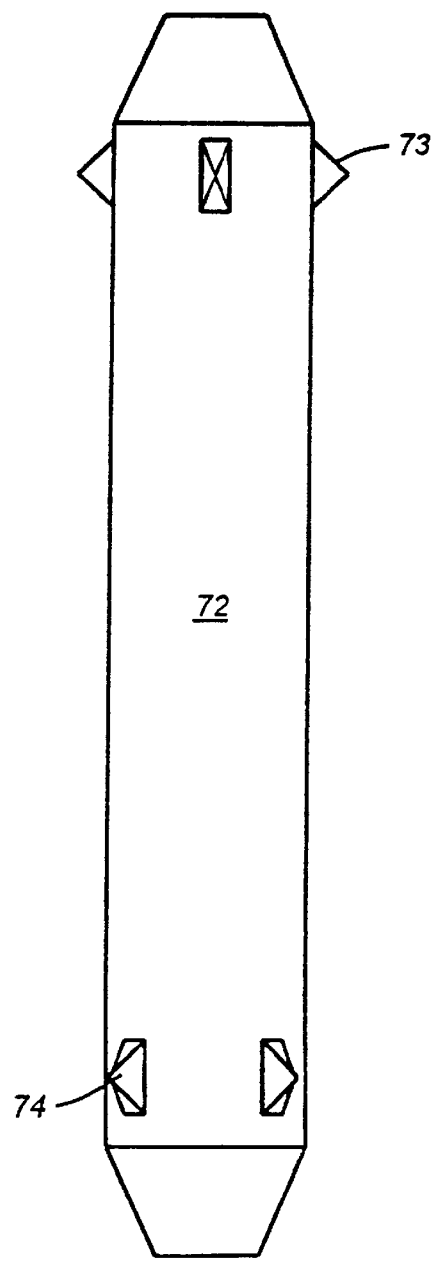
FIG. 7A is a schematic side view showing top and side views of a second embodiment of a tool employing concepts of the present invention.

Referring now to FIGS. 7A and 7B another embodiment according to the concepts of the present invention is shown schematically is both side and top views. In the arrangement of FIGS. 7A and 7B a tool body member 72 is provided near its upper end with a set of four coplanar pointed anchoring feet 73. The four anchoring feet 73 lie in the same plane and are disposed circumferentially 90° apart. Similarly, near the lower end of tool body 72 a second set of four coplanar anchoring feet 74 are also provided, spaced circumferentially 90° apart. The upper feet 73 and the lower feet 74 are angularly circumferentially displaced from each other by 45° as shown in FIG. 7B. In this arrangement there are thus provided 8 angular positions, circumferentially spaced at 45° apart, wherein three anchoring feet stably engage the well casing (not shown). If the configuration of FIGS. 7A and 7B is run in on a wireline, one or another of the 8 stable, three point contact positions will "fall" to the low side of the casing and stabilize the tool for seismic shooting.

Figure 8A:
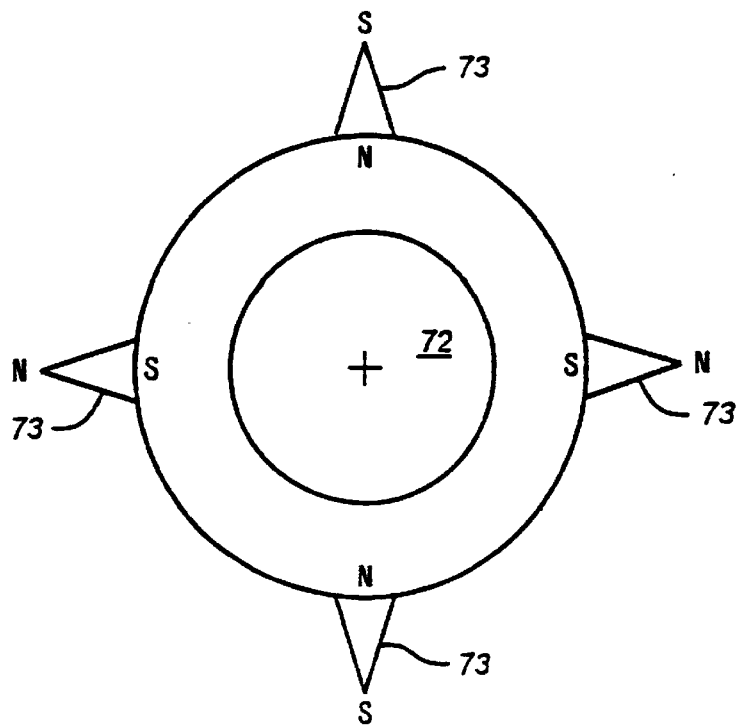
FIG. 8A is a schematic top view showing magnetic polarizations of feet of the tool of FIG. 7.

The embodiment of FIGS. 7A and 7B does not employ a locking arm. However, its stability may be improved by employing magnetic pole configurations as shown in a schematic top view in FIG. 8A. In the view of FIG. 8A it is seen that diagonally opposite pairs of feet 73 employ like, or repelling, magnetic poles, while 90 spaced feet have opposite magnetic poles. These magnets may be permanent magnets or can be electromagnets activated when tool lock is desired. The magnets need not be strong enough to support the weight of the tool body member module 72, but only strong enough to prevent undesired tool movement or angular oscillation during the course of a seismic survey.

Figure 8B:
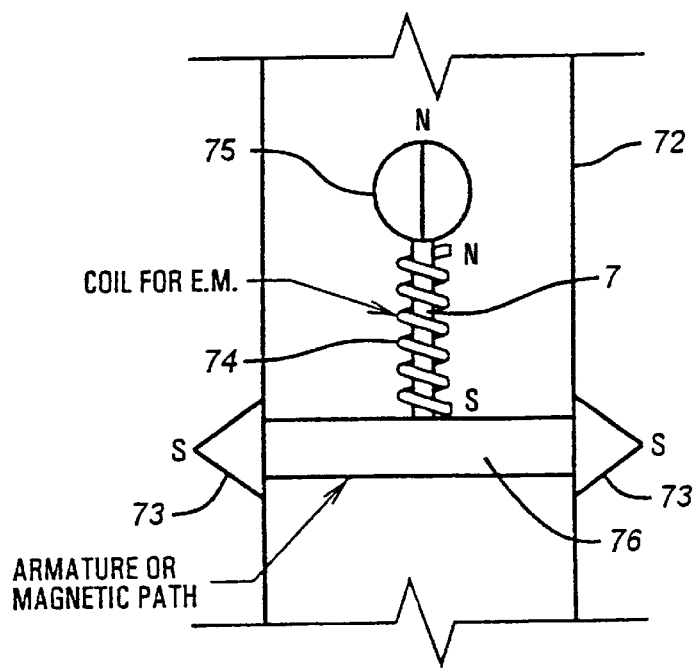
FIG. 8B is a schematic side view, partially in section, showing the arrangement of magnet poles in a version of the tool of FIG. 8A.

Referring now to FIG. 8B a variation of the embodiment of FIG. 8A is shown in a schematic side view. In the arrangement shown in FIG. 8B the opposite polarity magnetic pole feet (N for North, S for South) are displaced slightly from the coplanar arrangement of FIG. 8A. An electromagnet coil core 75 of a strong magnetic permeability material is disposed vertically inside tool body 72. A wire coil 74 is wound about the coil core 7. At each end of coil core 75 an armature piece 76 is disposed so that its ends form feet 73 for contacting the casing wall (not shown). When current is passed through coil 74 the top end of core piece 75 becomes a N pole and the bottom end a S pole. A magnetic attraction is thus asserted between the slightly un-coplanar feet 73. This assists in getting the 3 point stable contact desired with the casing for use of this tool member 72 embodiment.

While the feet shown in FIGS. 7A and 7B and 8A and 8B are shown attached to the tool body member 72 per se, this need not be done. If desired, feet 73 and 74 may be attached to a close fitting cylindrical sleeve which is placed about tool body 72. Such a sleeve could be confined longitudinally so that it does not slip off the ends of the tool body, but left free to rotate about the tool. In this mode the stabilizing feet are free to assume their preferred position without being affected by cable torque in the wireline cable used to deploy the system.

Figure 9:
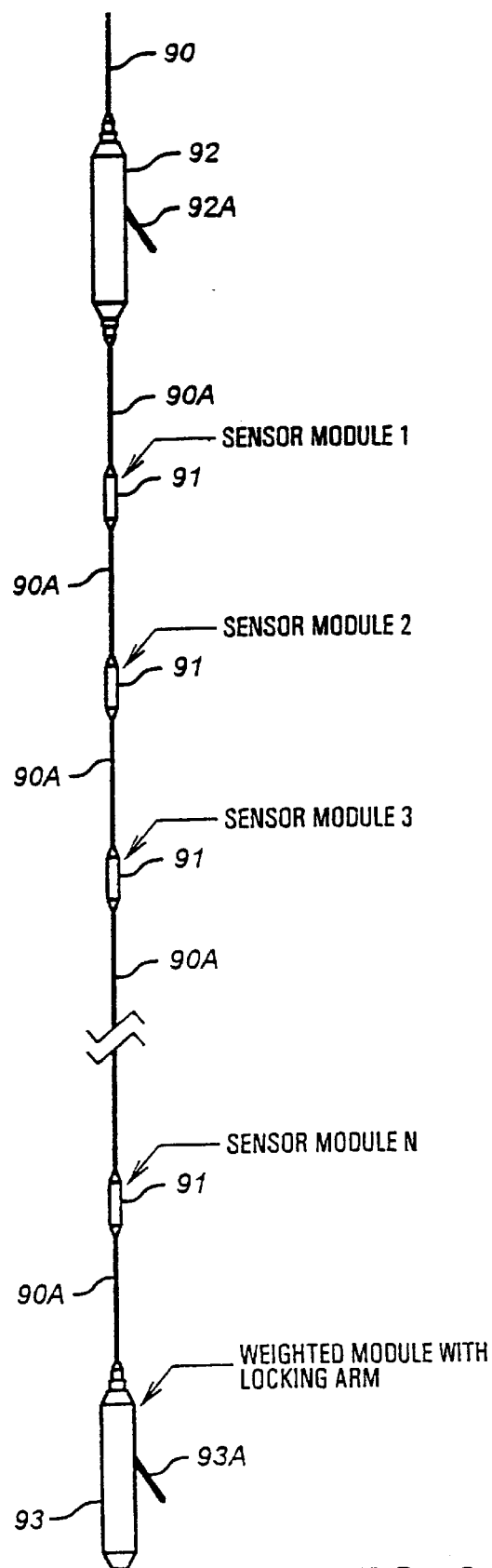
FIG. 9 is a schematic view of a borehole multi-level seismic detector system employing locking arms only on the top and bottom tool modules.

Referring now to FIG. 9 a complete system employing modules of the type described with respect to FIGS. 7A and 7B and 8A and 8B is shown schematically in side view. The system is suspended in a borehole via wireline cable 90. Sensor modules 91 are suspended from an upper locking module 92 having a locking arm 92A via jumper cable segments 90A. The array may contain as many such sensor modules 91 as desired. The system terminates in a second locking module 93 having a locking arm 93A. Module 93 may be a weighted or extra heavy module, if desired. The weighted or sinker module 93 ensures that a long string of sensor modules 91 and jumper cables 90A go down easily in the well.

When the system is lowered to the desired depth, the sinker module 93 backup arm 93A is deployed, locking this module in place. Once module 93 is locked in place cable 90 and jumper cables 90A are slacked off at the surface. This allows modules 91 to stabilize in place under the influence of gravity on their anchor feet and/or their magnets or electromagnets as desired. Then upper locking module 92 locking arm 92A is deployed, locking this module in place. Once module 92 is locked in place cable 90 is again slacked off from the surface. This relieves tension in cable 90 and isolates all of the detector modules 91 from stresses and vibrations passed down the cable 90 and jumpers 90A. Thus a very stable and safe from sticking vertically deployed borehole seismic detector system is provided.

The above descriptions may make changes and modifications apparent to those of skill in the art. The aim of the appended claims to cover all such changes and modifications as fall within the true spirit and scope of the invention.

I claim:

1. A system for stabilizing a tool body when deployed in a cased borehole, comprising:
   a substantially cylindrical tool body member having one substantially flat side, thereby forming corners for contacting the inside of the cased borehole; and
   a locking arm deployable at a desired depth in the cased well borehole, said locking arm being carried by said tool body member and being extensible therefrom on a side opposite said substantially flat side;
   whereby when said locking arm is extended it urges said corners of said substantially flat side into engagement with the inside of the cased borehole, thereby defining a stable position for the tool body.

2. The system of claim 1, wherein said corners of said substantially flat side are magnetic.

3. The system of claim 2, wherein said corners comprise permanent magnets of opposite polarity.

4. The system of claim 2, wherein said corners comprise opposite poles of an electromagnet.

5. A system for stabilizing a tool body when deployed in a cased borehole, comprising:
   a cylindrical tool body member having a circular cross section;
   a locking arm coupled to said tool body member; and
   a collar member disposed on said tool body member,
   said collar member having one substantially flat side, thereby forming corners for contacting the inside of the cased borehole;
   said locking arm being extensible from said tool body member on a side opposite said substantially flat side of said collar member;
   whereby when said locking arm is extended it urges said corners of said substantially flat side into engagement with the inside of the cased borehole, thereby defining a stable position for the tool body.

6. The system of claim 5 further comprising a foot member disposed diametrically opposite from said locking arm.

7. The system of claim 6, wherein said foot member is magnetic.

8. The system of claim 5, wherein said corners of said substantially flat side are magnetic.

9. A system for stabilizing a tool body when deployed in a cased borehole, comprising:
   a substantially cylindrical tool body member having two opposite ends;
   a set of circumferentially spaced apart substantially coplanar feet members carried exteriorly to said tool body member on each of said two opposite ends, said feet members configured to engage the inside wall of the cased borehole and to frictionally couple thereto, each set of said feet members being disposed with a circumferential offset relative to the set carried on the opposite end thereof.

10. The system of claim 9, wherein said feet members are attached to said tool body member.

11. The system of claim 9 further comprising a sleeve disposed about said tool body member, wherein said feet members are attached to said sleeve.

12. The system of claim 9 wherein each set of said feet members are magnetic.

13. The system of claim 12, wherein said feet members employ magnets such that diagonally opposite feet members employ repelling poles.

14. The system of claim 13, wherein said feet members are spaced apart circumferentially.

15. The system of claim 12, wherein said tool body member comprises an electromagnet.

16. The system of claim 9 wherein each set of circumferentially spaced apart feet members are displaced vertically in pairs having an opposite magnetic polarity.

17. The system of claim 9, wherein said tool body member is configured in a stable orientation when three of said feet members contact the cased borehole.

18. The system of claim 9, wherein each said set of said feet members comprises four feet members.

19. The system of claim 18, wherein said feet members in each said set are spaced 90 degrees apart.

20. The system of claim 19, wherein each set of said feet members on opposite ends of said tool body member is disposed with a 45 degree circumferential offset from the set carried on the opposite end thereof.

21. The system of claim 12, wherein said feet members comprise permanent magnets.

* * * * *